(12) United States Patent
Kingstone

(10) Patent No.: US 6,337,945 B1
(45) Date of Patent: Jan. 8, 2002

(54) FIBER OPTIC LIGHT BAR

(75) Inventor: Brett M. Kingstone, Orlando, FL (US)

(73) Assignee: SuperVision International, Inc., Orlando, FL (US)

( * ) Notice: Subject to any disclaimer, the term of this patent is extended or adjusted under 35 U.S.C. 154(b) by 0 days.

(21) Appl. No.: 09/396,640

(22) Filed: Sep. 15, 1999

(51) Int. Cl.[7] ............................................... G02B 6/00
(52) U.S. Cl. ..................... 385/147; 385/137; 385/116
(58) Field of Search ............................... 385/147, 901, 385/115, 116, 120, 135, 137; 313/110

(56) References Cited

U.S. PATENT DOCUMENTS

| | | |
|---|---|---|
| 3,644,922 A | 2/1972 | James et al. |
| 4,208,096 A | 6/1980 | Glenn, Jr. |
| 4,650,280 A | 3/1987 | Sedlmayr |
| 4,773,730 A | 9/1988 | Sedlmayr |
| 4,786,139 A | 11/1988 | Sedlmayr |
| 4,867,530 A | 9/1989 | Sedlmayr |
| 5,160,565 A | * 11/1992 | Chazalon et al. ........... 156/242 |
| 5,376,201 A | 12/1994 | Kingstone |
| 5,430,825 A | 7/1995 | Leaman et al. |
| 5,528,714 A | 6/1996 | Kingstone et al. ..................... |

* cited by examiner

*Primary Examiner*—Cassandra Spyrou
*Assistant Examiner*—Euncha Cherry
(74) *Attorney, Agent, or Firm*—James H. Beusse, Esq.; Beusse, Brownlee, Bowdoin & Wolter, P.A.

(57) ABSTRACT

A fiber optic light bar and method of manufacturing the same wherein a plurality of spacers having grooves formed therein are wound on a spool as a fiber optic cable is guided around the spool. The spacers have a channel section formed therein which serves to collect the plurality of fiber optic cable strands. The spacers are cut to create an output surface having a plurality of fiber optic cable ends. A cap is attached over the channel and a solid state light source is provided at the input ends of the cables formed by cutting the cable bundle between opposed spacers. Four fiber optic light bar assemblies may be formed by attaching spacers on opposed sides of a winding spool.

13 Claims, 2 Drawing Sheets

FIBER OPTIC LIGHT BAR

BACKGROUND OF THE INVENTION

This application is directed to the field of fiber optic lighting and in particular to an improved fiber optic light bar and method of manufacturing the same.

It is well known in the art to utilize a fiber optic device as a light source. A fiber optic light bar is a known structure having a frame with a plurality of openings formed therein, with a plurality of fiber optic cables disposed within the frame and having their ends positioned within the openings. As used herein, the term cable is meant to include a single fiber or a group of fibers. The lengths of the fiber optic cables are contained within the frame and exit the frame as a single bundle, preferably at one end of the frame. The fiber optic cable bundle extends to a remote location where a light source provides light energy to input ends of the plurality of fiber optic cables. The light travels through the bundle and exits the plurality of fiber optic cables at the outlet ends disposed within the frame.

Fiber optic light bars are known to have many uses, for example, as a light source for a merchandise display case. The frame of the light bar may be attached to an upper portion of the display case with the outlet ends of the fiber optic cables directed downward toward the merchandise. The fiber optic cable bundle is routed along the frame of the display case to the location of a remote light source. It is known in the art to utilize an incandescent light source to provide light energy to the input ends of the fiber optic cables of a fiber optic light bar. The light produced by such a light source is white light. U.S. Pat. No. 5,528,714 issued to Kingston, et al. and assigned to the assignee of the present invention, describes a color wheel that may be utilized with a fiber optic light bar to provide multicolored lighting from a fiber optic light source.

Prior art fiber optic light bars are expensive to manufacture because known manufacturing techniques are labor intensive. Light bars are produced by drilling multiple holes in the surface of a plastic, glass or metal housing, and then placing individual fibers of a desired length in the predrilled holes by a manual operation. The fibers are secured in the predrilled holes and the ends of the cables are cut flush to the surface of the housing. The plurality of fibers in the surface are then routed through the housing to one end where they are formed into a bundle to exit the housing.

There have been previous attempts to automate the production of a fiber optic light bar. One such attempt is U.S. Pat. No. 5,430,825 issued to Leaman, wherein a plurality of fiber optic strands is drawn between a pair of spaced apart insert sections having semicircular gaps designed to fit each of the fiber optic strands in a circular opening when the inserts are brought together. The applicants have found that this and other prior art techniques do not result in a sufficiently low manufacturing cost for some applications of a fiber optic light bar. Furthermore, the applicants desire a fiber optic light bar having improved flexibility for providing advanced lighting effects for a display case application.

SUMMARY OF THE INVENTION

In light of the limitations of the prior art, it is an object of this invention to provide an improved manufacturing process for a fiber optic light bar. It is a further object of this invention to provide a manufacturing process for a fiber optic light bar that requires a reduced amount of manual labor. It is a further object of this invention to provide a low cost fiber optic light bar. It is a further object of this invention to provide a fiber optic light bar having improved capabilities for providing multi-color lighting effects.

Accordingly a fiber optic light bar is provided having a fiber optic light bar comprising: a plurality of spacers, each spacer having a top surface and an opposed bottom surface, the plurality of spacers joined together to form a linear array wherein the plurality of top surfaces adjoin the plurality of bottom surfaces of respective adjacent spacers; a groove formed in a central portion of the respective top surfaces of each of the spacers, the grooves forming a plurality of passages from a front surface to a back surface of the linear array; a plurality of fiber optic cables disposed in the respective plurality of passages, each fiber optic cable having an end disposed adjacent the front surface and having a length extending beyond the back surface; each spacer further comprising wall members extending rearward beyond the central portion of the top surface to form a channel along the back surface of the linear array; the plurality of lengths of the plurality of fiber optic cables being disposed within the channel.

DETAILED DESCRIPTION OF THE INVENTION

Figure 1A:
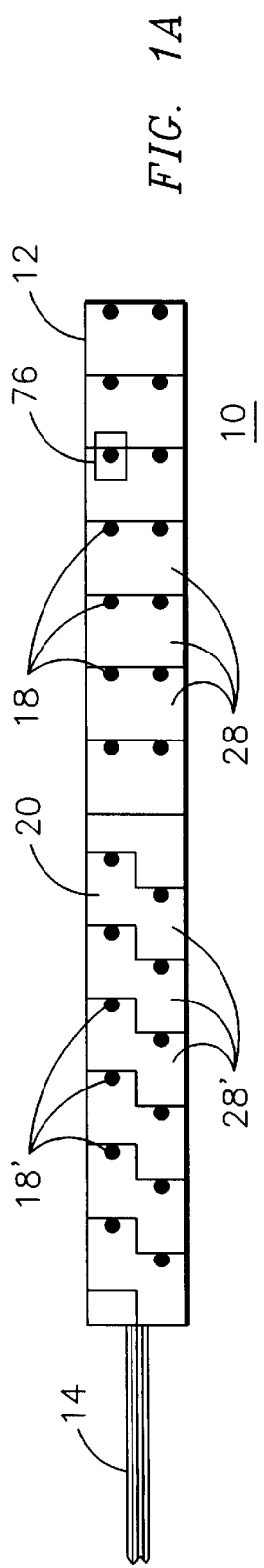
FIGS. 1A–1C illustrate front, side and bottom views respectively of a fiber optic light bar formed from a plurality of spacers in accordance with the present invention.
Figure 1B:
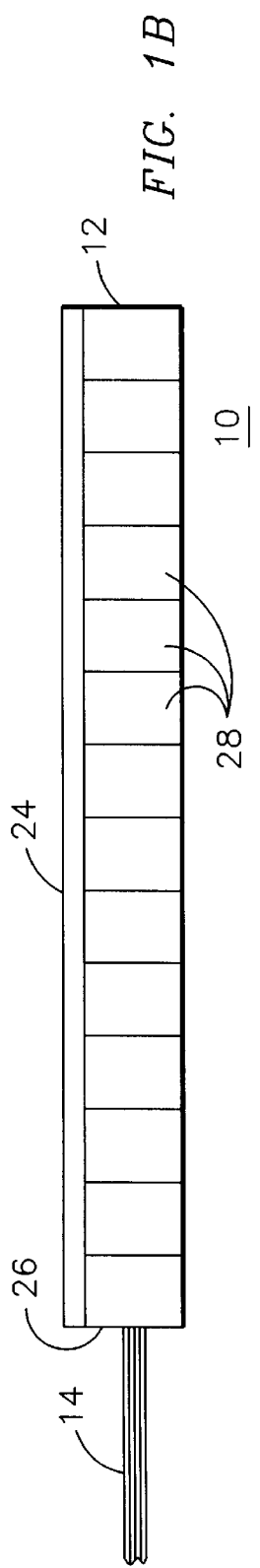
Figure 1C:
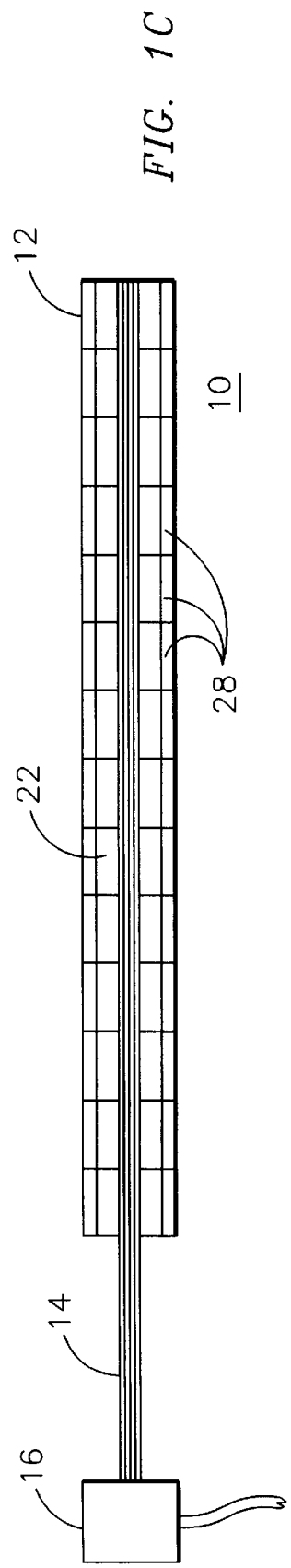

FIGS. 1A–1C illustrate a fiber optic light bar 10 in accordance with the present invention. Light bar 10 consists of a frame portion 12 and a fiber optic cable bundle 14. As is shown in FIG. 1C, the fiber optic cable bundle may be attached to a light source 16 as will be described more fully below.

FIG. 1A illustrates a front view of fiber optic light bar 10. A plurality of outlet ends 18 of fiber optic cables are disposed in respective holes (not shown) formed along a front surface 20 of light bar 10.

FIG. 1C illustrates a rear view of fiber optic light bar 10 showing the plurality of fiber optic cables disposed in channel 22 and extending as a bundle 14 beyond an end of the frame 12 to a light source 16. The individual fiber optic cables each pass through a respective passage (not shown) in frame 12 to extend from the back channel 22 to the front surface 20, where the respective output ends 18 are disposed to distribute light away from the fiber optic light bar 10. FIG. 1C illustrates light bar 10 with no cover over channel 22. Alternatively, FIG. 1B illustrates a side view of fiber optic light bar 10 showing a back cover 24 disposed over channel 22. Back cover 24 serves to capture the plurality of fiber optic cables within channel 22 and may also serve as a mounting device for the fiber optic light bar 10. Fiber optic cable bundle 14 may exit the frame 12 at an end 26 or through an opening (not shown) in back cover 24.

Figures 2, 3:
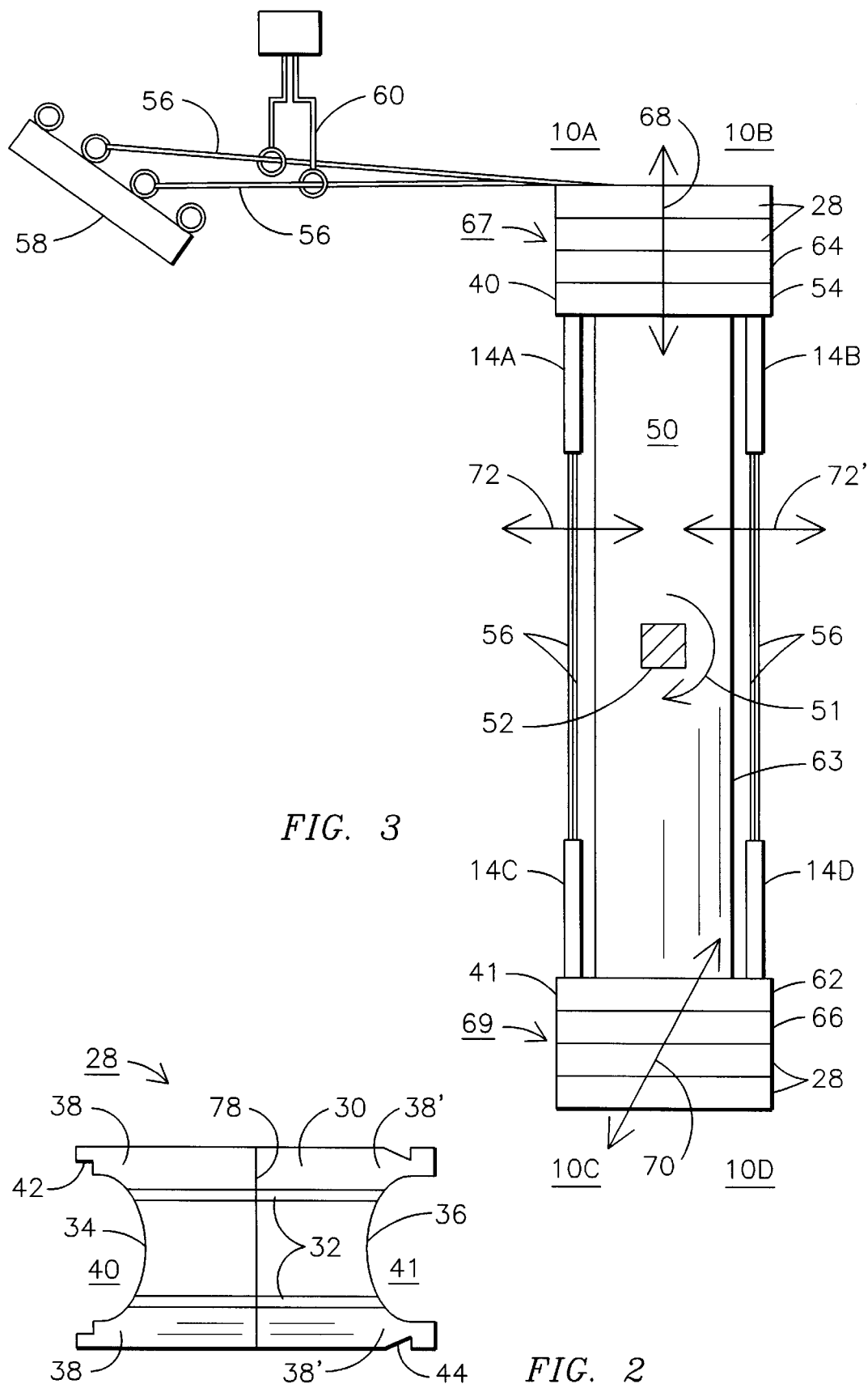
FIG. 2 illustrates a typical spacer that may be used to manufacture a fiber optic light bar in accordance with the present invention.
FIG. 3 illustates an apparatus utilized in the process of manufacturing four fiber optic light bars simultaneously in accordance with this invention.

The frame 12 of light bar 10 of FIGS. 1A–1C is formed from a plurality of spacers 28. A top view of an individual spacer 28 is illustrated in FIG. 2. A plurality of spacers 28 are stacked and then cut in half along score line 78 to form two mirror image frames 12 in a process described in further detail below. As illustrated in FIG. 2, an individual spacer 28 has a top surface 30 of a generally rectangular shape. Top surface 30 may have one or more grooves 32 formed in a central portion thereof. Grooves 32 form a plurality of passages for the passage of fiber optic cables (not shown in FIG. 2) from a front surface 34 to a back surface 36 of the spacer 28. One or both ends of the spacer 28 may have a wall member 38,38' formed to extend beyond the central portion of the front surface 34 and/or rear surface 36. A pair of wall members 38/38 or 38'/38' form a channel 40 or 41 along the front surface 34 and/or rear surface 36 respectively. When a plurality of spacers 28 are stacked in a linear array to form frame 12 of FIGS. 1A–1C, channel areas 40,41 are aligned to form the channel 22 as illustrated in FIG. 1C and discussed above. Spacer 28 may further include a notch 42 wherein a back cover 24 may be disposed to cover the channel area 40. Alternatively a notch 44 may be formed in an exterior surface of spacer 28 for a back cover 24 that is designed to snap over the top of spacer 28 to cover channel 41, as is illustrated by cover 24 of FIG. 1B.

Spacers 28 may be generally flat along the entire top surface 30, or they may have a multi-level surface as is illustrated in FIG. 1A. Spacers 28 in FIG. 1A are illustrated as having a flat top surface 30. Spacers 28' are illustrated as having a two-tiered surface. Note that the one each of the grooves 32 in spacers 28' are formed on each respective tiers of the top surface, thereby giving the pattern of outlet ends 18' of the fiber optic cables a triangular pattern, A flat spacer 28 will provide a rectangular pattern for the ends 18 of the fiber optic cables.

FIG. 3 illustrates a device and method for manufacturing a fiber optic light bar utilizing spacers 28. A spool 50 is mounted on a hub 52 that can be rotated in the direction of arrow 51. A plurality of spacers 28 are first formed of any known material, for example plastic, aluminum, or steel, by any known process, for example injection molding or machining. A first spacer 54 of the plurality of spacers 28 is then attached to spool 50. One or more fiber optic cables 56 may be provided from a spool rack 58. The fiber optic cables 56 are guided into groove 32 (not shown) of first spacer 54 by a guiding mechanism 60 such as a linear actuator or a robotic arm. Hub 52 and spool 50 are then rotated as fiber optic cables 56 are guided through the front channel 40 (hidden in FIG. 3) and around spool 50. A second spacer 62 is attached to spool 50 on a side opposed first spacer 54. As spool 50 and hub 52 are rotated, fiber optic cables 56 are directed through back channel 41 and grooves 32 (both hidden in FIG. 3) of second spacer 62. As spool 50 continues to be rotated, fiber optic cables 56 will be wound around a rear side 63 of spool 50. A third spacer 64 is then placed over first spacer 54 so that a bottom surface of the third spacer 64 abuts the top surface of the first spacer 54. In this manner, fiber optic cables 56 disposed in grooves 32 of first spacer 54 are enclosed and captured within the grooves 32 by second spacer 64. Similarly, fourth spacer 66 is placed over second spacer 62, as the hub 52 and spool 50 continue to be rotated and fiber optic cables 56 are played onto the respective spacers. The steps of placing of spacers 28 and guiding of the fiber optic cable 56 are repeated as the spool 50 is rotated a predetermined number of times so that the fiber optic cable 56 completes a predetermined number of passes through the front channel 40 of the first spacer 54. Note that the front channel 40 of first spacer 54 will contain one pass of the fiber optic cable 56 for each additional spacer 28 that is added to the assembly.

Once a predetermined number of spacers have been placed on the spool 50, the fiber optic cables 56 and spacers 28 are secured together to form an assembly. One method of securing the cables 56 and spacers 28 is to apply an adhesive or glue to each spacer as it is placed onto the assembly. For example, an adhesive may be placed in each groove 32 prior to guiding the fiber optic cable into the groove 32. In this manner excess adhesive displaced by the fiber optic cable 56 will be forced between the adjacent spacers 28, thereby securing the adjacent spacers to each other. The physical properties of the adhesive may be selected to decrease the loss of light from the fiber optic cables 56 along their length. For example, the adhesive may contain titanium oxide which serves to reflect light back into the length of the cable, thereby improving the optical transmission properties of the cable. Alternatively, the assembly of spacers 28 and fiber optic cables 56 may be secured together with mechanical clamps (not shown) that serve to hold the adjacent layers of spacers 28 together. The plurality of passes of fiber optic cables 56 passing between the top stack 67 and bottom stack 69 of spacers 28 may be bundled together with a protective cover to form a fiber optic cable bundle 14A,14B,14C,14D.

The secured spacers 28 and fiber optic cables 56 may then be removed from spool 50, and prepared for a cutting operation whereby the assembly is cut into a plurality of fiber optic light bars. The cutting operation may be any known process, for example by using a saw or hot wire or laser beam. A cut may be made in the assembly along a plane illustrated by line 68 in stack 67 intersecting the predetermined number of spacers 28 between the front and rear surfaces thereof. A score line 78 may be provided across a top surface 30 of spacer 28 to facilitate the cutting operation. This cut will expose a plurality of ends of the fiber optic cables 56, thereby creating a plurality of output ends for a light bar 10. The exposed output ends 18 of the light bar 10 created by cutting along plane 68 may be polished subsequent to the cutting process to improve their optical properties. Similarly, a cut may be made along a non-perpendicular plane 70 in stack 69 to obtain a light bar structure output ends that are not perpendicular to the axis of the fiber optic cable 56. The multiple passes of fiber optic cables 56 are cut along planes 72,72'. In the process of making cuts along planes 68,70,72,72', four separate light bar assemblies 10A, 10B, 10C, 10D are created. Note that the size of spool 50 may be selected to obtain a predetermined length of fiber optic cable bundle 14A–D upon completion of the winding process.

A similar process may be used to manufacture any number of light bar assemblies by stacking spacers 28 on one or more sides of a spool. The embodiment illustrated in FIG. 3 is utilized to produce four light bar assemblies. In this embodiment the fiber optic cables 56 are drawn naturally into channel 40 as the spool 56 is rotated. Other embodiments involving different placement of stacks of spacers 28 on spool 50 may tend to draw the fiber optic cable 56 out of the channel of subsequent spacers as the stack of spacers increases in height. For such embodiments, a means should be provided to restrain the cable within the channel section of the spacers during the manufacturing process in order to facilitate the installation of a back cover 24 over the channel 40 upon completion of the winding process. Such a means may include applying glue to the cable 56 and pressing it into the channel on each pass, or a mechanical shape formed into the spacer 28 for capturing the fiber optic cable 56 within the channel 40 on each pass.

Once the fiber optic light bar assemblies 10A–10D are separated into individual units, a light source 16 may be attached to the exposed input ends of the fiber optic cable bundle 14A–D. Advantageously, light source 16 may be a solid state light source, such as one or more light emitting diodes or laser diodes. A solid state light source will provide light energy with a minimum of wasted heat energy being produced. Furthermore at least one each of a red, a green, and a blue light emitting diode may be utilized in order to provide a full spectrum color capability for light bar 10. Each individual fiber optic strand of cable bundle 14 may be attached to a separate solid state light source, or a single solid state light source may provide light to a plurality of such cable strands. Furthermore, a light director or diffuser such as lens or prism 76 as illustrated in FIG. 1A may be provided adjacent the output end 18 of one or more of the fiber optic cables of light bar 10. The fiber optic light bar 10 of the present invention provides flexibility to the lighting designer by providing a plurality of colors, a plurality of geometric arrangement of the light emitting fiber ends 18, and a plurality of light directing or diffusing devices 76 at the cable ends 18.

The embodiments described herein are provided by means of example not limitation. Accordingly the scope of the applicants' invention is as defined in the following claims.

I claim:

1. A fiber optic light bar comprising:

a plurality of spacers, each spacer having a top surface and an opposed bottom surface, the plurality of spacers joined together to form a linear array wherein the plurality of top surfaces adjoin the plurality of bottom surfaces of respective adjacent spacers;

a groove formed in a central portion of the respective top surfaces of each of the spacers, the grooves forming a plurality of passages from a front surface to a back surface of the linear array;

a plurality of fiber optic cables disposed in the respective plurality of passages, each fiber optic cable having an end disposed adjacent the front surface and having a length extending beyond the back surface;

each spacer further comprising wall members extending rearward beyond the central portion of the top surface to form a channel along the back surface of the linear array;

the plurality of lengths of the plurality of fiber optic cables being at least partially disposed within the channel.

2. The fiber optic light bar of claim 1, wherein the groove formed in each spacer comprises a first groove, and further comprising a second groove formed in the central portion of the respective top surface of each spacer, the plurality of second grooves forming a second plurality of passages from the front surface to the back surface of the linear array;

a second plurality of fiber optic cables disposed in the respective second plurality of passages, each of the second plurality of fiber optic cables having an end disposed adjacent the front surface and having a length extending beyond the back surface and disposed within the channel.

3. The fiber optic light bar of claim 2, wherein the top surface of each spacer comprises a first level having the first groove formed therein and a second level having the second groove formed therein.

4. The fiber optic light bar of claim 1, wherein the groove formed in each spacer comprises a first groove, and further comprising N additional grooves formed in the central portion of the top surface of each spacer, where N is an integer number equal to or greater than one, the N additional grooves forming a second plurality of passages from the front surface to the back surface of the linear array;

a second plurality of fiber optic cables disposed in the respective second plurality of passages, each of the second plurality of fiber optic cables having an end disposed adjacent the front surface and having a length extending beyond the back surface and disposed within the channel.

5. The fiber optic light bar of claim 1, further comprising a back cover disposed over the channel.

6. The fiber optic light bar of claim 1, further comprising:

a notch formed in each of the plurality of spacers, and a cover disposed over the channel and formed to fit within the notch of each of the plurality of spacers.

7. The fiber optic light bar of claim 1, wherein the respective passages are formed at a non-perpendicular angle with respect to the front surface;

and wherein each of the respective fiber optic cable ends has an end surface parallel to the front surface and at a non-perpendicular angle with respect to its respective passage.

8. The fiber optic light bar of claim 1, wherein the plurality of fiber optic cables and the plurality of spacers are adhered together with an adhesive operable to decrease the loss of light from at least a portion of the length of the respective fiber optic cables.

9. The fiber optic light bar of claim 8, wherein the adhesive comprises titanium oxide.

10. The fiber optic light bar of claim 1, wherein the length of each of the plurality of fiber optic cables comprises an input end;

and further comprising a light source disposed to direct light into the input end of each of the plurality of fiber optic cables.

11. The fiber optic light bar of claim 10, wherein the light source comprises a plurality of light emitting diodes.

12. The fiber optic light bar of claim 10, wherein the light source comprises a plurality of laser diodes.

13. The fiber optic light bar of claim 10, wherein the light source comprises a solid state laser light source.

* * * * *